J. P. HAYES.
BAKE OVEN.
No. 15,422.  Patented July 29, 1856.
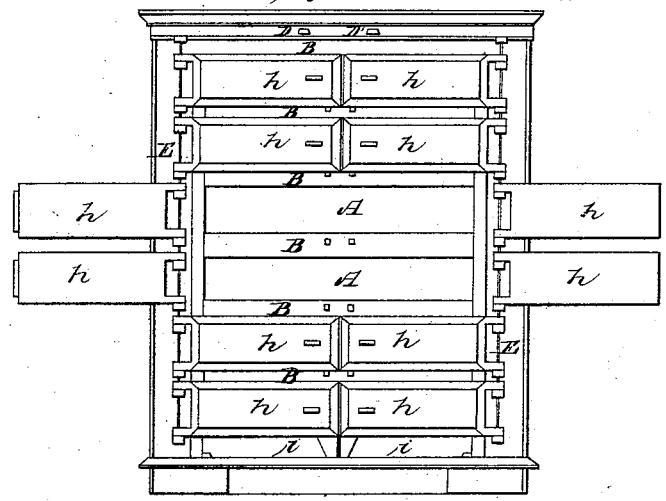
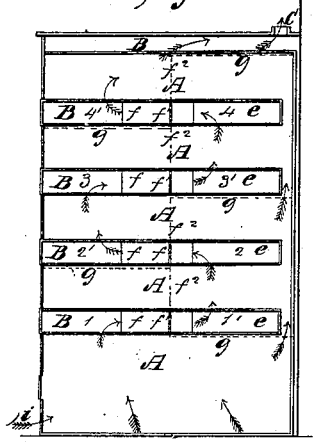 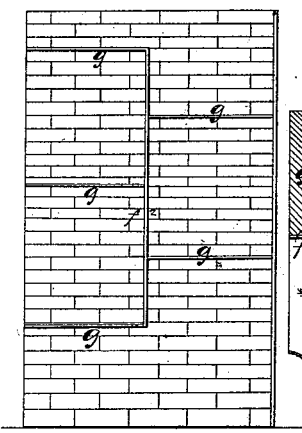 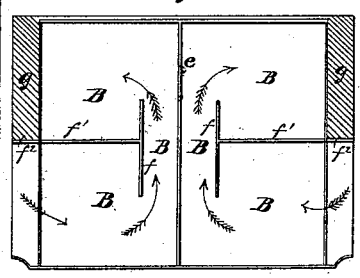
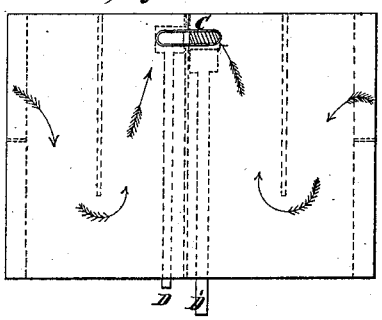
Witnesses:  Inventor:
John P. Hayes

UNITED STATES PATENT OFFICE.

JOHN P. HAYES, OF PHILADELPHIA, PENNSYLVANIA.

BAKE-OVEN.

Specification of Letters Patent No. 15,422, dated July 29, 1856.

*To all whom it may concern:*

Be it known that I, J. P. HAYES, of the city of Philadelphia, in the State of Pennsylvania, have invented a new and useful Improvement in Pastry-Baking Ovens; and I do hereby declare that the following is a full, clear, and exact description of the construction and operation of the same, reference being had to the accompanying drawings, making a part of this specification, in which—

Figure 1, is a front elevation; Fig. 2, a vertical transverse section; Fig. 3, a view of the side walls and flue plates built therein; Fig. 4, a plan view of the flues and division plates of the oven proper; and Fig. 5, a plan view of the top plate of the same, showing the escape flue and the regulating or damper valves—like letters indicating the same objects when on the different figures.

The nature of my invention consists in a peculiar construction and arrangement together of a series of horizontal baking chambers, and intermediating heating flues governed by damper valves, in relation to each other and to the permanent receiving chamber within which they are movably placed, whereby the heat from the usual fire chamber below, can be either equally distributed over the outer surfaces of each of the baking chambers, or, governed so as to produce both a hotter and a cooler half in each of the baking chambers as occasion may require, while at the same time the whole series of the said baking chambers and flues may at any time be conveniently withdrawn together, from the said containing chamber, for the purpose of cleaning the flues, or for repairing, as occasion may from time to time require, without pulling down, or displacing any part of the said permanent chamber or of its adjacent walls.

Referring to the drawings A, A, are the baking chambers; B—B, the flues for heating them; C, the escape flue; D, D, the damper valves; and E, the front casing of the receiving chamber. The baking chambers (A) and intermediating flues (B) are combined together as shown in Fig. 2; the flues being each divided transversely by means of the partitions ($e$—$e$) into two equal parts, and each of these parts divided by the partitions ($f$—$f'$) so as to form them into an entrance and return flue each, for the heated products of combustion from the fire chamber below, when the said partition ($f'$) is in juxtaposition with the vertical plate ($f^2$) which is built in the wall of the receiving chamber, and part of the lower edges of the horizontal flues (B—B) in juxtaposition with the horizontal plates ($g$—$g$) also built in the walls (as shown in Fig. 3, and by the red lines in Fig. 2,) the said combined apparatus being placed within the receiving chamber (E) as shown in Fig. 1. When so placed, there is then formed a continuous flue on each side of the same, which conveys the heat, in the direction of the red arrows, from the fire chamber below to the escape flue (C) above, thus in its passage coming in contact with and heating the whole of both the upper and lower surfaces of the baking chambers (A—A); and each of the two said flues being provided with a distinct damper valve (D and D'), the amount of heat passing through the flues can be equalized or varied at pleasure so as either to keep both halves of the baking chambers (A—A) at the same degree of heat or to compel either the whole or a portion of the heat from the fire to pass around the one half only of the said baking chambers, so as to produce both a hotter and a cooler portion in the same baking chamber.

The front or casing of the receiving chamber (E) is made of cast iron, and is fitted with doors ($h$—$h$) by which the mouths of the ovens or baking chambers are respectively closed or opened as shown in Fig. 1. The sides and back of the said receiving chamber being built of brick in the usual manner, and the series of ovens and intermediate flues arranged horizontally above a fire chamber (which should be constructed in the usual manner, and is therefore not shown in the drawing) so that the said ovens and intermediate flues can be together readily withdrawn from the stationary chamber for cleansing the flues &c., or returned and the ovens closed by the doors shutting against the casing thereof as occasion may require. An opening ($i$, $i$) is left at the bottom of the doors of the lowest baking chamber so as to admit fresh air into all the baking chambers, the said air passing up behind the flues (B—B) as shown by the dark arrows in Fig. 2, and finding sufficient openings for egress, through the joints of the doors above.

In pastry-baking ovens no sufficient and convenient provision has heretofore been made for removing the dust, ashes or soot which rapidly accumulates in the flues; nor for increasing or diminishing at pleasure, the heat in different parts of the same baking chamber—both of which are especially required in pastry baking apparatuses; and it will be perceived that these requisites are obtained in perfection by my invention—the first, by the arrangement of the fixed plates $f^2$ and $g$ in the side walls so as to correspond with the partitions and divisions of the flues and yet allow the ready withdrawal of the said baking chambers and their intermediate flues together, the interior of the latter being, when thus withdrawn, entirely open and exposed for cleaning—which operation can therefore be effected and the apparatus replaced, in a few minutes; and the second, by the peculiar construction and relative arrangement of the flues and baking chambers whereby the heat from the fire chamber is caused to pass in two currents therefrom to every part of the exterior upper and lower surfaces of the baking chambers (A—A), each current entering the flue, first at 1, thence around back of the partition $f$, and out at $1^1$—thence upwardly and in at 2, and out at $2^1$, and so on, as shown by the red arrows, to the escape flue (C)—each current being entirely separate and distinct from the other, and controllable in its strength, or entirely checked, at the pleasure of the operator, by its own damper valve D or $D^1$.

Having thus fully described the construction and operation of my invention and shown its utility, I proceed to state that what I claim as my invention and desire to secure by Letters Patent, is as follows, viz:

I claim the heating flues (B—B) arranged as described—that is, so as to cause the products of combustion to pass from the fire chamber below, first into the lower flue (B) at 1, thence behind its partition ($f$) and out at $1^1$,—thence into the next flue (B) above at 2, and out at $2^1$,—and so on, as shown by the arrows, through the successive flues which may be above, to the escape flue G—the said flues (B) being arranged on the two sides of the casing as described, and divided by the partition $e$, and the products of combustion being directed, thereby together with the partition plates $f$ and $g$, in the wall, substantially as described.

JOHN P. HAYES.

Witnesses:
 BEN. MORISON,
 M. O. B. KENNEY.